United States Patent [19]

Simich

[11] 4,055,328
[45] Oct. 25, 1977

[54] BALE-TIE JOINER TOOL
[75] Inventor: Emil Simich, Chicago, Ill.
[73] Assignee: A. J. Gerrard & Company, Des Plaines, Ill.
[21] Appl. No.: 739,197
[22] Filed: Nov. 5, 1976
[51] Int. Cl.² ............................................. B66F 19/00
[52] U.S. Cl. ......................................... 254/79; 100/32
[58] Field of Search .................. 254/77, 79; 100/1, 8, 100/32; 81/3 R; 140/123.5; 24/27

[56] References Cited
U.S. PATENT DOCUMENTS

| | | | |
|---|---|---|---|
| 445,829 | 2/1891 | Baer | 254/79 |
| 694,952 | 3/1902 | English et al. | 254/79 |
| 1,076,792 | 10/1913 | Sedam | 100/32 |

Primary Examiner—Robert C. Watson
Attorney, Agent, or Firm—Emrich, Root, O'Keeffe & Lee

[57] ABSTRACT

A manual bale-tie joiner tool is adapted to be engageable with the looped ends of the bale-tie wire which has been inserted about a compressed bale of material. Upon the rotational movement of the joiner tool while engaged with the looped ends of the bale tie-wire, the looped ends of the bale-tie wire are interlocked together to retain the bale-tie wire about the compressed bale.

8 Claims, 23 Drawing Figures

BALE-TIE JOINER TOOL

BACKGROUND OF THE INVENTION

In the past, the looped ends of bale-tie wires, which are positioned about a compressed bale of material in a press, have benerally been fastened or interlocked together by manually engaging the looped ends and forcing the ends together to interlock the same about the compressed bale of material. Because heavy gauge tie-wire must be used in these baling presses, extra length wire is required to provide extra wire slack to provide flexible ends and to permit the manual engagement of these ends together in interlocking relationship. Additionally, because extra wire slack is required, the compressed bales which are manually tied do not provide sufficient densities when released from the baling press as are the desired. Also, the heavy gauge tie wire is difficult to handle and the increased cost of manual labor and the time involved in interlocking them together has restricted their widespread application.

Attempts to overcome these increased costs in manual labor involved in interlocking together the looped ends of the bale-tie wires and to increase the bale densities have involved the application of bale-tie wire interlocking devices which have been designed and developed for adaption to fit into the bale-tie accommodating channels in the platens of the baling press. These bale-tie interlocking devices are adapted such that upon the manual insertion of the looped ends of the bale-tie wires into the interlocking devices, the looped ends are automatically interlocked together. These interlocking devices are expensive and are not adapted to fit many of the baling presses now in existence because of the various dimensions of the bale-tie accommodating channels. Accordingly, in many of the present baling presses, the only means for engaging the looped ends of the bale-tie wires together is by hand, a costly and difficult task.

SUMMARY OF THE INVENTION

One object of the present invention is to provide a bale-tie joiner tool for engaging the looped ends of a bale-tie wire and interlocking them together about a compressed bale of material.

Another object of the present invention is to provide a bale-tie joiner tool adapted for manually tightening a bale-tie wire about a compressed bale while simultaneously interlocking the looped ends together.

A further object of the present invention is to provide a novel tool for providing compressed bales of material having increased bale densities because of the usage of shorter bale-tie wires about the girth of the bale.

It is still another object of the present invention to provide a novel bale-tie joiner tool which provides increased leverage for reduced operator effort in engaging the looped ends of the bale-tie wire and interlocking the same together about the girth of the bale.

In a preferred embodiment of the present invention, the bale-tie joiner tool is provided to assist in tieing together the looped ends of wire bale-ties that have been inserted around the girth of a bale of material which is under compression in a baling press. Customarily, the bale-tie wire includes a continuous wire strand having a pair of looped ends formed at each end of the wire in opposite directions with respect to each other. Each looped end includes an end portion bent out of the plane of each respective loop in opposite directions thereof. As is well known in the art, conventional baling presses include upper and lower base platens, one of which is generally actuated by ram or other means to be movable up and down to compress and release a bale of material. These upper and lower platens include a plurality of bale-tie accommodation channels therein, such that upon the compression of material within the press, which permit the insertion of bale-tie wires therein such that the bale-tie wire extends about the girth of the compressed bale, with the looped ends extending outwardly on the side of the compressed bale.

The bale-tie joiner tool includes a shaft member having a handle portion on one end thereof and a tool portion on the opposite end thereof. The tool portion, preferably bent out of the plane of the handle portion to permit rapid engagement of the tool portion with the looped ends of the wire, includes a finger projection integrally formed to the tool portion, and extending outwardly from the tool portion. The tool portion includes a shoulder portion at the end where the finger projection is joined to the tool portion and a U-shaped plate member integrally mounted to the tool portion adjacent the shoulder portion wherein the finger projection extends from the end of the tool portion. The U-shaped plate member includes a pair of plate tabs extending forwardly in a parallel plane relationship with respect to the finger projection. Preferably, the forward end portion of the upper plate tab is bent out of the plane of the U-shaped plate member to provide easy insertion of the bale-tie joiner tool in engagement with the upper looped end of the bale-tie wire. The junction between the plate tab members of the U-shaped plate member are positioned at the shoulder portion wherein the finger projection extends outwardly from the shaft member. Thus, the pair of plate tabs and the finger projection define a slotted opening which is adapted to receive the bale-tie wire to permit the tool to engage each of the looped ends of the wire and interlock the looped ends together.

To utilize the bale-tie joiner tool according to the present invention, the upper looped end of the bale-tie wire is engaged with the lower plate tab with the body of the wire bale-tie extending upwardly between the finger projection and the upper plate tab while the bale-tie joiner tool is held in a horizontal position. The lower looped end of the bale-tie wire is then positioned and engaged by the lower plate tab. As the joiner tool is initially rotated in a clockwise movement, the two looped ends are cammed towards the closed end or junction of the U-shaped plate member until the upper looped end portion engages the shoulder portion and the junction of the U-shaped plate member. Upon the further clockwise rotation of the joiner tool to approximately 90°, the upper looped end of the bale-tie wire is pulled downwardly by the downward rotational movement of the outside peripheral edge of the U-shaped plate member and the lower looped end of the bale-tie wire is pulled upwardly because of the upward pivotal movement of the lower plate member thereby resulting in the lower looped end of the bale-tie to be cammed towards the upper looped end thereby engaging the looped ends together. The looped ends are fully engaged together when the pivotal movement of the joiner tool is approximately 90° from the horizontal at rest position. Upon the return of the joiner tool to its horizontal at rest position, the looped ends are snapped into the fully interlocked position and the tool may be readily removed from the interlocked ends of the bale tie-wire for a subsequent operation of engaging and interlocking additional bale-tie wires around the girth of a compressed bale.

In a further embodiment of the present invention, the bale-tie joiner tool is of nearly identical construction as the above-described embodiment of the present invention with the exception that the lower plate tab includes an elongated tongue projection member thereon which permits the engagement of the tool with the lower looped end of the bale-tie wire when the bale tie-wire is of a shorter length.

Thus, to utilize the bale-tie joiner tool according to this embodiment, the upper looped end of the bale-tie wire is engaged with the lower plate tab with the body of the wire bale-tie extending upwardly between the finger projection and the upper plate tab while the bale-tie joiner tool is held in a horizontal position. The lower looped end of the bale-tie wire is then positioned and engaged by the lower elongated tongue member. If necessary, it is generally desirous to slightly rotate upwardly, from the horizontal at rest position, the handle portion to permit the tongue member to engage the lower looped end of the wire. As the joiner tool is initially rotated in a clockwise movement the two looped ends are cammed towards the closed end or junction of the U-shaped plate member until the upper looped end portion engages the shoulder portion and the junction of the U-shaped plate member. Upon the further clockwise rotation of the joiner tool to approximately 90°, the upper looped end of the bale-tie wire is pulled downwardly by the downward rotational movement of the outside peripheral cam edge of the U-shaped plate member and the lower looped end of the bale-tie wire is pulled upwardly because of the upward pivotal movement of the tongue member thereby resulting in the lower looped end of the bale-tie being cammed towards the upper looped end thereby engaging the looped ends together. The looped ends are fully engaged together when the pivotal movement of the joiner tool is approximately 90° from the horizontal at rest position. Upon the return of the joiner tool to its horizontal at rest position, and the looped ends are snapped into the fully interlocked position and the tool may be readily removed from the interlocked ends of the bale-tie wire for a subsequent operation of engaging and interlocking additional bale-tie wires around the girth of a compressed bale.

In still a further embodiment of the present invention, the bale-tie joiner tool includes a shaft portion having a handle portion on one end thereof and a tool portion on the opposite end thereof. Again, the tool portion is preferably bent out of the plane of the handle portion to permit ready grasping of the tool and ready access to the looped ends of the wire. Mounted to the tool portion of the joiner tool is a toggle bracket member. Each end of the toggle bracket member extends outwardly from the tool portion and is bent over into a separate plane with respect to the tool portion of the bale-tie joiner tool to provide engaging toggle members which are adapted to engage and hold the looped ends of the bale-tie wire. Each of the toggle members include recesses therein which engage and hold the looped ends of the bale-tie wire and permit the toggle action to provide the interlocking of the looped ends, as will hereinafter be described.

In operation, one toggle member of the joiner tool is engaged with the upper looped end of the bale-tie wire when the joiner tool is in the horizontal at rest position. The handle portion is then rotated slightly upwardly from the at rest position to permit the other toggle member to engage the lower looped end of the bale-tie wire extending below the joiner tool. When the two looped ends have been engaged by the end toggle members, the joiner tool is manually rotated in a clockwise movement thereby pulling downwardly on the upper looped end while simultaneously pulling upwardly on the lower looped end of the bale-tie wire. When the joiner tool has been rotated approximately 90° in a clockwise movement, the looped ends of the bale-tie wire are in engagement and a toggle action occurs whereby the one end toggle member permits the lower looped end to slip out of the recess therein thereby resulting in a toggle action which permits the engaged looped ends to be interlocked together. Upon the return of the joiner tool to the horizontal at rest position, the joiner tool may be readily removed from the looped interlocked ends of the bale-tie wire for a subsequent operation of engaging and interlocking additional bale-tie wires around the girth of the compressed bale.

Another embodiment of the present bale-tie joiner tool includes a tool having a handle portion on one end and a tool portion on the opposite end thereof. The tool portion is preferably bent out of the plane of the handle portion to permit ready grasping of the tool and ready access to the looped ends of the wire. Mounted to the end of the tool portion is a U-shaped plate member. The U-shaped plate member includes a pair of forwardly extending plate tabs, with the upper plate tab being bent out of the plane of the lower plate tab to be positioned in a parallel plane from the plane of the lower plate tab. The junction between the plate tab extensions of the U-shaped plate member includes a recess therein to receive the bale-tie wire and permit the joiner tool to pivot about the axis, thus engaging and locking the looped ends of the bale-tie wire together. The U-shaped member includes also an outer peripheral edge surface having a projection member thereon which is adapted to engage the upper looped end of the bale-tie wire to retain the same on the tool during the pivotal movement of the tool to engage and interlock the looped ends of the wires together.

To utilize the bale-tie joiner tool in accordance with the present embodiment, the upper looped end of the bale-tie wire is engaged by the projection member on the outer peripheral edge on the lower plate tab. Upon an upward pivotal movement of the joiner tool, the lower looped end of the bale-tie wire is engaged by the lower tab member. The joiner tool is then rotated in a clockwise rotation whereby the upper looped end is pulled downwardly by the downward rotational movement and the lower looped end of the bale-tie wire is pulled upwardly by the upward movement of the lower plate member thereby resulting in the lower looped end being cammed towards the upper looped end thereby engaging the looped ends together. The looped ends are fully engaged together when the joiner tool is pivotally rotated to approximately 90° from the horizontal at rest position. Upon the return of the joiner tool to its horizontal at rest position, the looped ends are snapped into the fully interlocked position and the tool may be readily removed from the interlocked ends of the bale-tie wire for a subsequent operation of engaging and interlocking additional bale-tie wires around the girth of the compressed bale.

The unique and novel design of the bale-tie joiner tool of the present invention permits the operator of a baling press to rapidly engage and interlock together the looped ends of the bale-tie wires extending around the girth of the compressed bale. Additionally, the joiner tool permits the utilization of shorter lengths of bale-tie wire during a pressing operation because the joiner tool provides an operator leverage to permit engaging the bale-tie wire looped ends together and interlocking the same. This results in compressed bales having greater density than are ordinarily achieved in baling operations because upon the release of the press platens, the shorter length of baling wire about the girth of compressed bale restricts the expansion of the bale thereby resulting in a greater density of the baled material.

DETAILED DESCRIPTION

Referring now to the drawings, wherein like reference numerals have been used throughout the several drawings to identify the same or similar parts, conventional baling presses generally comprise a movable upper base platen, actuated by ram or other means, and a lower stationary platen which are movable up or down to press or release a bale of material, as is well known in the art. These presses are useful in baling materials such as cotton, stable fiber, paper and the like. Located in each of the upper and lower platens are a plurality of bale-tie accommodation channels which are adapted to receive bale-tie wires 32, the looped ends of which are manually inserted through the accommodating channels to extend outwardly from the side of baling press. The looped ends of these bale-tie wires are then manually interlocked together to retain and hold the bale when the upper platen is released. The novel bale-tie joiner tool of the present invention is directed to rapidly and efficiently interlocking the looped ends of the bale-tie wires together.

Figures 3, 5:
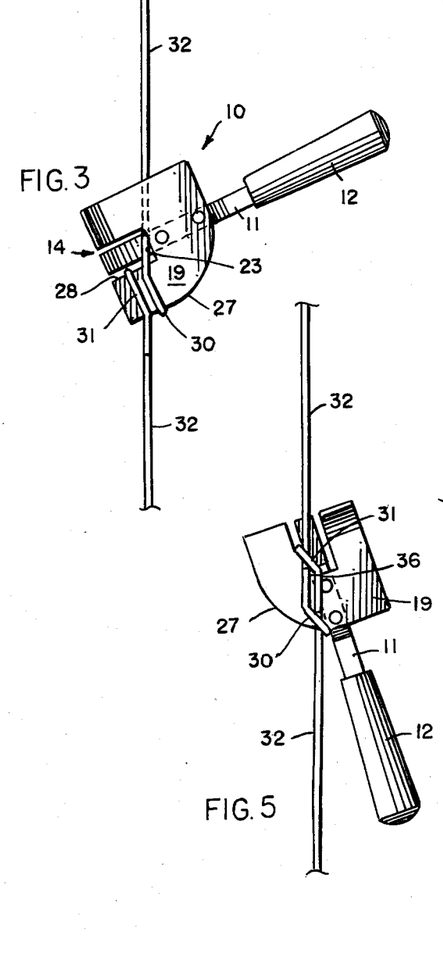
FIG. 3 is a side-elevational view showing the operative engagement of the lower looped end of the bale-tie wire with the joiner tool in accordance with the present invention.
FIG. 5 is a side-elevational view showing the interlocked looped ends of the bale-tie wire upon the return of the bale-tie joiner tool to its at rest positions.
Figure 4:
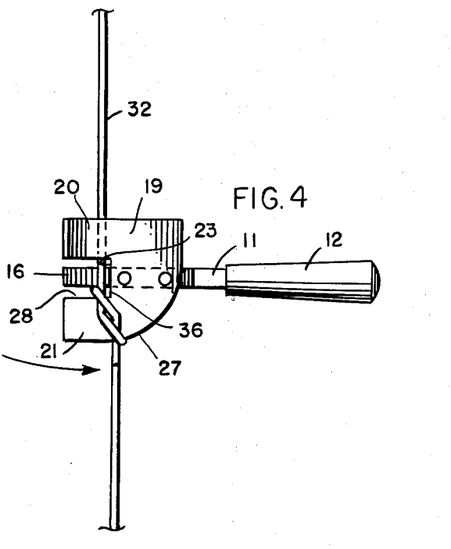
FIG. 4 is a side-elevational view showing the interlocking of the looped ends together upon the clockwise rotation of the joiner tool in accordance with the present invention.

Briefly, the bale-tie wire 32 includes a continuous wire strand which has a pair of looped ends, an upper looped end 30 and a lower looped end 31 formed at each end of the wire, as shown in FIGS. 3, 4 and 5. The upper and lower looped ends 30 and 31 are formed in opposite directions with respect to each other and each looped end includes end portions 34 and 35, respectively, bent out of the plane of each respective loop in opposite directions thereof.

Figure 1:
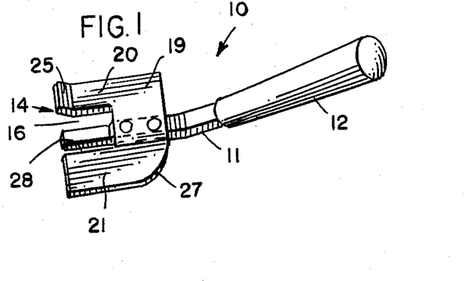
FIG. 1 is a perspective view of a bale-tie joiner tool in accordance with the present invention.

In FIG. 1, there is shown a bale-tie joiner tool 10 which includes a shaft member 11 having a handle portion 12 on one end thereof and a tool portion 14 located on the opposite end of the shaft member 11. The tool portion 14 of the bale-tie joiner tool 10 is preferably bent out of the plane of the handle portion 12 of the shaft member 11 to provide leverage for the user of the tool and to provide ready access of the tool portion to the looped ends of the bale-tie wire along the side of the compressed bale, as will hereinafter be described.

Figure 6:
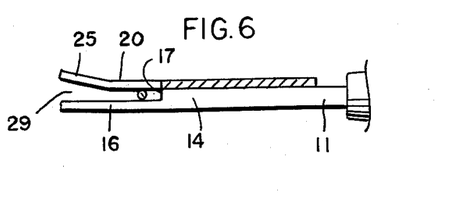
FIG. 6 is a sectional view taken through line 6—6 of FIG. 2.

The tool portion 14 of the bale-tie joiner tool 10 includes a finger projection element 16 extending from the plane of the tool portion on the shaft member 11. The finger projection element 16 is integrally formed with the shaft member 11 and includes a shoulder portion 17 thereon. The tool portion includes also a U-shaped plate member or means 19 mounted integrally to the tool portion 14. The U-shaped plate member 19 includes an upper tab member 20 and a lower tab member 21 extending forwardly from the saddle or junction 23. The U-shaped member or means 19 is fixedly mounted to the tool portion 14 such that the saddle or junction 23 of the U-shaped member is adjacent the shoulder portion 17. The U-shaped member or means 19 may be rigidly mounted or fastened to the tool portion by rivets, bolts or welding, as is well known in the art. Preferably, the upper tab member 20 includes an end portion 25 bent out of the plane of the upper tab member 20 to provide easy engagement of the bale-tie joiner tool 10 with the upper looped end 30 of the bale-tie wire 32. The U-shaped member or means 19 is mounted and attached to the tool portion such that the upper and lower tab members 20 and 21 extend forwardly in a parallel plane with respect to the finger projection element 16 to provide a slotted opening 29 therein which is adapted to receive the bale-tie wire 32, as shown in FIG. 6. Additionally, the U-shaped member or means 19 includes an outer peripheral edge cam surface 27 thereon and a loop ledge surface 28 thereon, which cooperates with the lower looped end 31 of the bale-tie wire 32 to cause the same to become engaged with the upper looped end 30 of the bale-tie wire 32, during the pivotal movement of the bale-tie joiner tool 10.

Figure 2:
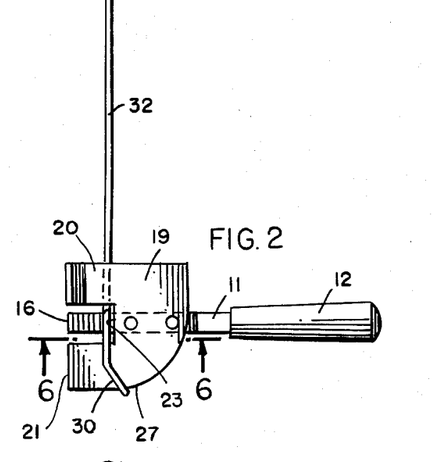
FIG. 2 is a side-elevational view showing the operative engagement of the bale-tie joiner tool with the upper looped end of the bale-tie wire in accordance with the present invention.

In operation, the bale-tie joiner tool 10 is manually grasped by the handle portion 12 and the tool portion is engaged with the upper looped end 30 such that the looped end 30 completely encircles the lower tab member 21 and the wire strand extends upwardly through the slotted opening 29 between the finger projection element 16 and the upper plate tab member 20, as shown in FIG. 2. The joiner tool 10 is held in engagement with the bale-tie wire 32 such that the wire is adjacent the shoulder portion 17 and the saddle or junction 23, as shown in FIG. 3. In such a position, the joiner tool 10 is in the horizontal at rest or initial starting position.

Where it is desired to engage the lower looped end 31 with the tool, the looped end 31 is positioned past the lower tab member end 26 and onto the inner pivoting corner 36 of the lower plate tab member 21, a position as shown in FIG. 3. As shown in FIG. 3, the joiner tool 10 has been partially pivoted in a counterclockwise path to permit the engagement of looped end 31 over tab member 21.

As shown in FIG. 4, when the joiner tool 10 is pivoted in a clockwise movement to nearly the vertical position with respect to its starting position, the lower looped end 31 is moved downwardly along the ledge surface 28 until the looped end thereof engages the pivoting corner 36 at the junction 23 on the U-shaped member 19. During this clockwise pivotal movement, the upper looped end 30 is also pulled downwardly because of the camming action resulting between the looped end 30 and the outer peripheral cam edge 27 of the U-shaped member 19. When the joiner tool level is in the vertical position, as in FIG. 4, the looped ends 30 and 31 are engaged together. Upon the pivotal return of the joiner tool 10 from the vertical acutated condition to the horizontal at rest position, the looped ends are interlocked together and the tool may then be readily removed from the interlocked ends for a subsequent operation of engaging and interlocking additional bale-tie wires about the girth of the compressed bale.

FIG. 7-12 show a further embodiment of the bale-tie joiner tool 10 which includes a shaft member 11 having a handle portion 12 on one end thereof and a tool portion 14 located on the opposite end of the shaft member 11. The tool portion 14 is preferably bent out of the plane of the handle portion 14 on the shaft member 11 to provide leverage for the user of the tool during interlocking of the looped ends of the bale-tie wire and to provide access of the tool portion to the looped ends of the bale-tie wire along the side of the compressed bale.

Figures 7, 8, 9, 10, 11, 12:
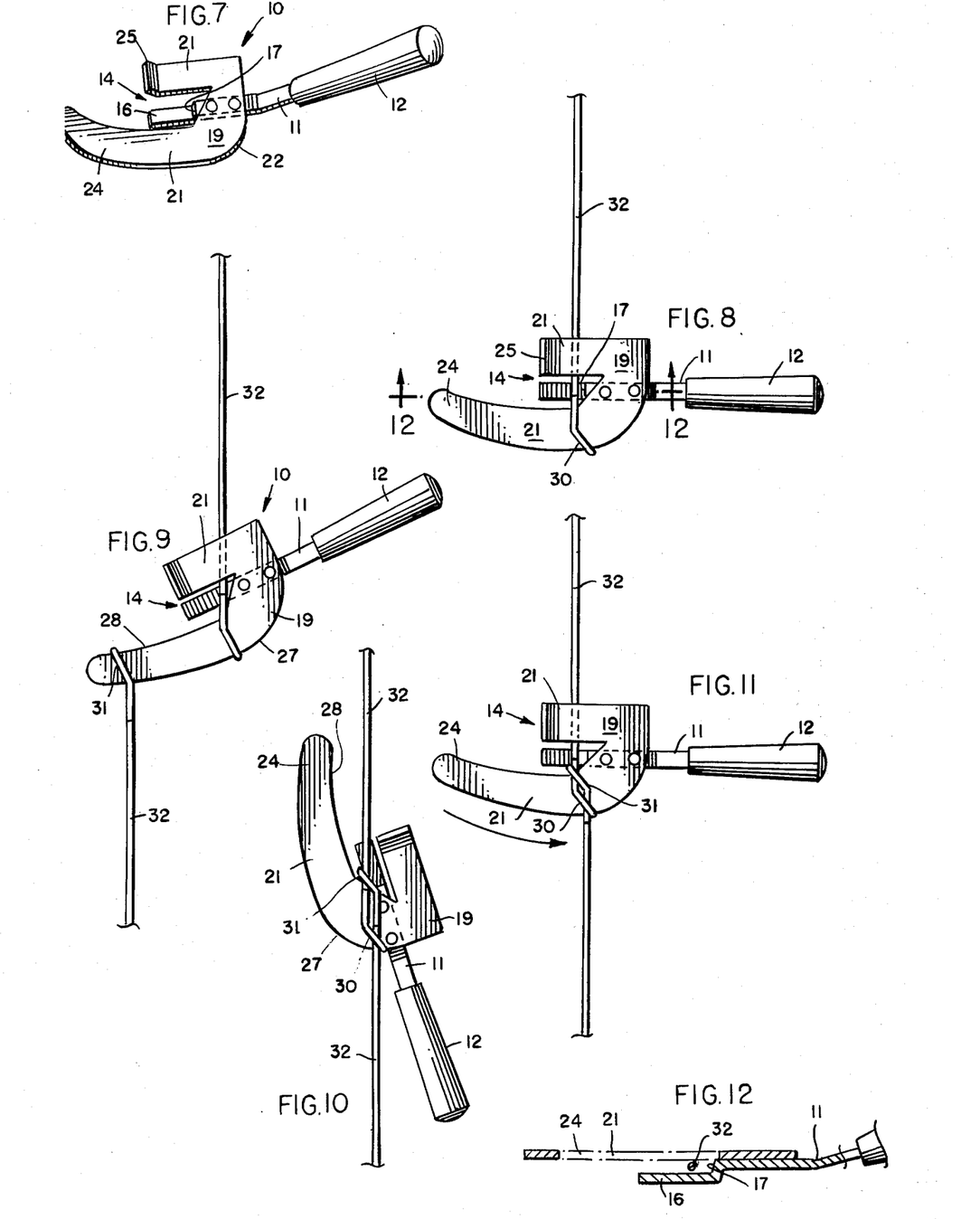
FIG. 7 is a perspective view showing a bale-tie joiner tool in accordance with a further embodiment of the present invention.
FIG. 8 is a side-elevational view showing the operative engagement of the bale-tie joiner tool embodiment in accordance with FIG. 8 with the upper looped end of the bale-tie wire.
FIG. 9 is a side-elevational view showing the operative engagement of the lower looped end of the bale-tie wire with the bale-tie joiner tool embodiment as shown in FIG. 7.
FIG. 10 is a side-elevational view showing the engagement of the looped ends of the bale-tie wire together upon the clockwise rotation of the joiner tool embodiment, as shown in FIG. 7.
FIG. 11 is a side-elevational view showing the interlocked looped ends of the bale-tie wire upon the return of the bale-tie joiner tool, as shown in FIG. 7, to its initial engaging position.
FIG. 12 is a sectional view taken through lines 12—12 of FIG. 8.

In the joiner tool 10, as shown in FIG. 7, the tool portion 14 includes a finger projection element 16 extending from the plane of the tool portion on the shaft member 11. The finger projection element 16 is integrally formed onto shaft member 11 and includes a shoulder portion 17 thereon. A U-shaped plate member 19 is mounted integrally to the tool portion 14 and includes an upper tab member 20 and a lower tab member 21 extending forwardly from the saddle or junction 23 of the U-shaped member 19. The plate member 19 is mounted to the tool portion 14 such that the saddle or junction 23 is adjacent the shoulder portion 17. Preferably, the upper tab member 20 includes an end portion 25 bent out of the plane of the upper tab member 20 to provide easy engagement of joiner tool 10 with the upper looped end 30 of the tie wire 32. The lower tab member 21 includes an extended slip hook extension means 24 formed integrally thereon which extends forwardly from the saddle or junction 23, the U-shaped member 19 is mounted and attached to the tool portion 14 such that the upper and lower tab member 20 and 21 extend forwardly in a parallel plane with respect to the finger projection element 16 to provide a slotted opening 29 therein which is adapted to receive the bale-tie wire 32, as shown in FIG. 12. The U-shaped member 19 includes also an outer peripheral surface cam edge 27 thereon and a ledge surface 28 on the extended slip hook member 24, which cooperates with lower looped end 31 to cause the same to be engaged with the upper looped end 30 of the wire 32 during the pivotal movement of the joiner tool 10 from the horizontal position to the vertical actuated position.

When it is desired to engage and interlock the looped ends of a wire which are substantially shorter than conventional bale-tie wires to provide a compressed bale having greater densities, the bale-tie joiner tool 10, as shown in FIGS. 7-12, is utilized. The joiner tool 10 is manually grasped by the handle portion 12 and the tool is engaged such that the upper looped end 30 completely encircles slip hook member 24 and the wire strand extends upwardly through the slotted opening 29 between the finger projection element 16 and the upper plate tab member 20, as shown in FIG. 12. The tool is then held in engagement with the wire 32 such that the wire is adjacent the shoulder portion 17 and the saddle or junction 23, as shown in FIG. 8.

To engage the joiner tool with a lower looped end 31, the joiner tool handle portion is pivoted upwardly such that the extended slip hook member 24 rotates downwardly to engage the lower looped end 31. The lower looped end is then positioned on the extended hook member 24 and onto the inner camming surface 28, a position as shown in FIG. 9. When both looped end members have been engaged by the joiner tool 10, the handle portion is rotated downwardly in a clockwise fashion. Such pivotal movement to nearly a vertical actuated position with respect to the at rest position results in the camming movement of the lower looped end 31 along the inner camming surface 28, until the looped end 31 engages the corner 36 at the saddle or junction 23 and the upper looped end 30 is pulled downwardly by the outer peripheral edge 27 being in engagement with the end of the looped end 30 such that the looped ends are fully engaged together, a position as shown in FIG. 10. Upon the of the joiner tool 10 to the horizontal at rest position, the looped ends 30 and 31 are interlocked together and the tool may then be removed from the interlocked ends for a subsequent operation of engaging and interlocking additional bale-tie wires around the girth of the compressed bale.

FIGS. 19–23 show a further embodiment of the invention wherein the bale-tie joiner tool 10 includes a shaft member 11 having a handle portion 12 on one end thereof and a tool portion 14 located on the opposite end of the shaft member 11. The tool portion 14 is bent out of the plane of the handle portion 12 to provide ready axis of the tool to the looped ends 30 and 31 of the bale-tie wire along the side of the compressed bale and to provide leverage for the user of the tool during its operation, as will hereinafter be described.

Figures 19, 20, 21, 22, 23:
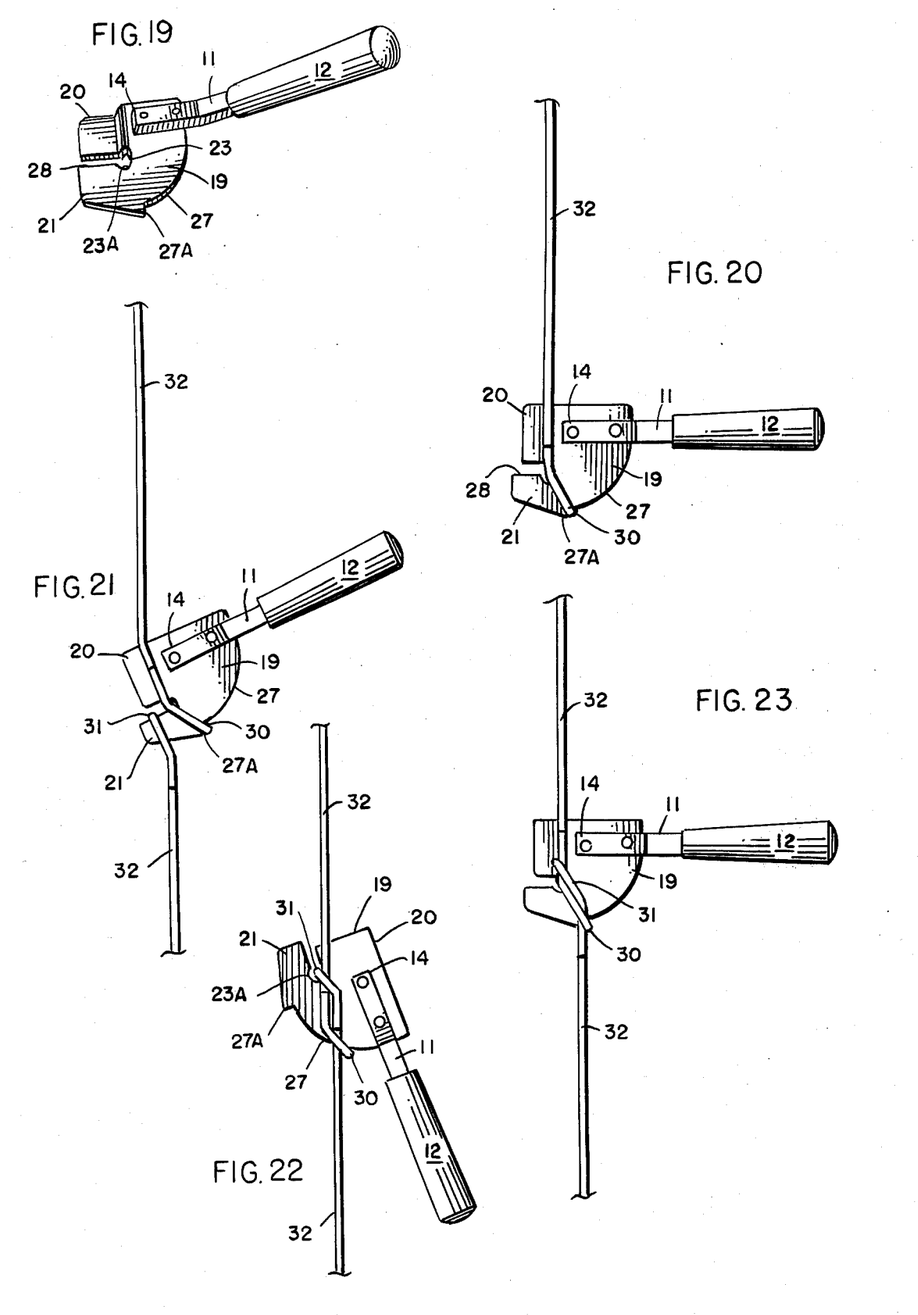
FIG. 19 is a perspective view of a bale-tie joiner tool in accordance with still another embodiment of the present invention.
FIG. 20 is a side elevational view showing the operative engagement of the bale-tie joiner tool embodiment in accordance with FIG. 19 with the upper looped end of the bale-tie wire.
FIG. 21 is a side-elevational view showing the operative engagement of the lower looped end of the bale-tie wire with the bale-tie joiner tool embodiment, as shown in FIG. 19.
FIG. 22 is a side-elevational view showing the engagement of the looped ends of the bale-tie wire together upon the clockwise rotation of the bale tie joiner tool.
FIG. 23 is a side-elevational view showing the interlocked looped ends of the bale-tie wire upon the return of the bale-tie joiner tool as shown in FIG. 19, to its initial engaging position.

A U-shaped plate member or means 19 is mounted integrally to the end of the tool portion 14 by conventional means. The U-shaped plate member 19 includes an upper tab member 20 and a lower tab member 21 extending forwardly from the saddle or junction 23 of the U-shaped member 19. In this embodiment, the upper tab member 20 is bent out of the plane of the lower tab member 21 to extend forwardly in a plane parallel to the plane of the lower tab member 21. The U-shaped plate member 19 includes a recess 23A located at the junction 23 thereof, which recess is adapted to receive the bale-tie wire 32 and to permit the joiner tool to pivot about the pivot point 36 during the engaging and locking operation of the looped ends of the bale-tie wire. The lower tab member 21 includes an outer peripheral cam edge 27 thereon and an inner surface 28. A projection 27A, extending outwardly from the outer peripheral surface edge 27, is adapted to engage the upper looped end 30 of the bale-tie wire to retain the same on the tool during the pivotal movement of the joiner tool during the engaging and interlocking of the looped ends of the wire together, as will hereinafter be described.

To utilize the bale-tie joiner tool 10 in accordance with the present embodiment, the upper looped end 30 of the bale-tie wire 32 is engaged by the lower tab member 21 such that the looped end is engaged by projection 27A on the outer surface 27. Upon a slightly upward pivotal movement of the joiner tool 10 from the horizontal at rest position, the lower looped end 31 of the bale-tie wire is engaged by the inner surface 28 on the lower tab member 21, as shown in FIG. 21. The joiner tool 10 is then rotated in a clockwise rotation to approximately 90° from the at rest position, as shown in FIG. 22, the upper looped end 30 is pulled downwardly and the lower looped end 31 is pulled upwardly thereby resulting in a camming movement of the lower looped end 31 toward the upper looped end 30 at the juncture 23, as shown in FIG. 22. When the joiner tool is returned to its horizontal at rest position, the looped ends are snapped into a fully interlocked position. The joiner tool may then be removed from the interlocked ends for subsequent operations of engaging and interlocking additional bale-tie wires around the girth of the compressed bale.

FIGS. 13–18 show a further embodiment of the present invention wherein the bale-tie joiner tool 10 includes a shaft member 11 having a handle portion 12 on one end thereof and tool portion 14 on the opposite end. Again, the tool portion 14 is bent out of the plane of the shaft member 11 to provide ready access of the tool portion to the looped ends of the bale-tie wire along the side of the compressed bale and to provide leverage for the user of the tool during its operation.

Figures 13, 14, 15, 16, 17, 18:
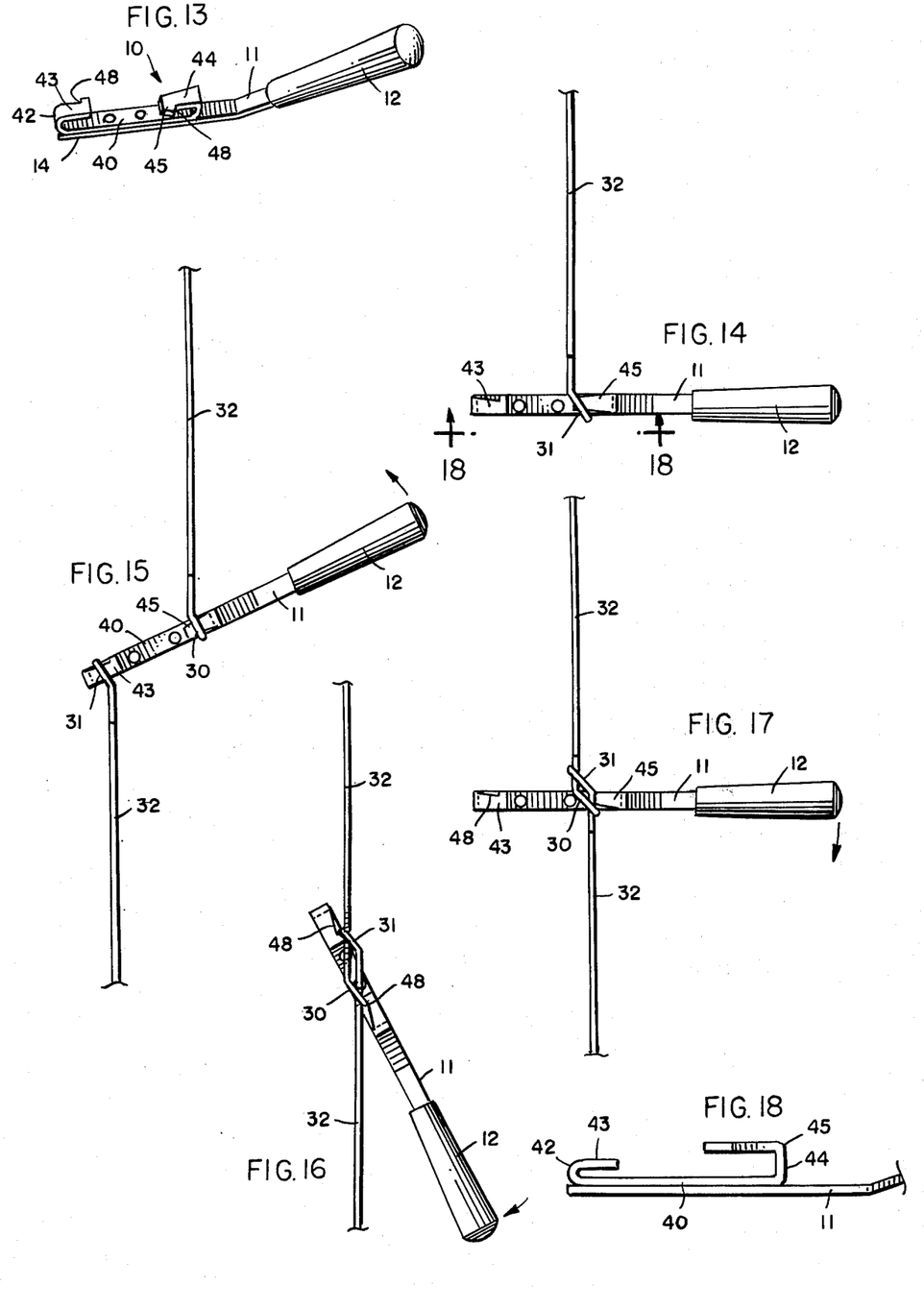
FIG. 13 is a perspective view showing a bale-tie joiner tool in accordance with still another embodiment of the present invention.
FIG. 14 is a side-elevational view showing the operative engagement of the bale-tie joiner tool embodiment in accordance with FIG. 13 with the upper looped end of the bale-tie wire.
FIG. 15 is a side-elevational view showing the operative engagement of the lower looped end of the bale-tie wire with the bale-tie joiner tool embodiment, as shown in FIG. 13.
FIG. 16 is a side-elevational view showing the engagement of the looped ends of the bale-tie wire together upon the clockwise rotation of the joiner tool embodiment, as shown in FIG. 13.
FIG. 17 is a side-elevational view showing the interlocked looped ends of the bale-tie wire upon the return of the bale-tie joiner tool, as shown in FIG. 13, to its initial engaging position.
FIG. 18 is a sectional view taken through line 18—18 of FIG. 14.

Tool portion 14 of the joiner tool 10 includes a toggle bracket member 40 mounted thereon. The toggle bracket member 40 is fixedly mounted or fastened to the tool portion 14 by rivet, bolts or welding, as is desired. The toggle bracket member 40 includes a pair of end members 42 and 44 extending outwardly from the bracket members. The end members 42 and 44 are bent over into separate planes (FIG. 18) with respect to the tool portion 14 of the bale-tie joiner tool 10 to provide engaging toggle members 43 and 45, respectively, which are adapted to engage and hold the looped ends 30 and 31 of the bale-tie wire 32. Each of the end members 42 and 44 of the bracket member 40 includes recesses 48 therein which engage and hold the looped ends 30 and 31 of the bale-tie wire and provide the toggle action to result in the interlocking of the looped ends, as will hereinafter be described.

To operate the joiner tool, the handle portion 12 is manually grasped and the tool is held in the horizontal at rest position so that the end member 44 having engaging toggle member 45 thereon engages the upper looped end 30 such that the looped end rests in recess 48. The handle portion 12 is then pivotally rotated upwardly such that the end member 42 moves downwardly such that the engaging toggle member 43 thereon engages the lower looped end 31, a position as shown in FIG. 15. Upon the downward clockwise pivotal movement of the handle portion 12, the tool portion 14 pivots about the point wherein the engaging toggle member 45 engages the upper looped end 30. As the handle portion 12 is further rotated to almost a vertical position, as shown in FIG. 16, wherein the looped ends 30 and 31 are in engagement, a toggle action occurs whereby the lower looped end 31 slips out of the recess 48 in engaging toggle member 43 to permit the engaged looped ends to be interlocked together. Upon the return of the joiner tool to the horizontal at rest position, the joiner tool may be readily removed from the looped interlocked ends for a subsequent operation of engaging and interlocking additional bale-tie wires around the girth of the compressed bale.

The unique and novel design of the bale-tie joiner tool of the present invention provides the operator of a baling press with increased leverage in rapidly engaging and interlocking together looped ends of the bale-tie wire around the girth of the bale. Additionally, the joiner tool simplifies the positioning of the looped end member relative to one another for proper engaging and interlocking the same together and permits the utilization of shorter lengths of bale-tie wires thereby resulting in increased bale densities while simultaneously reducing the tieing experience time involved in engaging and interlocking the looped ends together. Also, the novel design of the present invention eliminates incompleted knots which occur during manual engagement and interlocking of the looped ends of the bale-tie wire together.

I claim:

1. A bale-tie joiner tool for use in engaging and interlocking together the upper and lower pre-formed looped ends of the bale-tie wire extending around a compressed bale, including in combination:

elongated shaft means, handle means mounted on one end of said shaft means, and tool means mounted on said other end of said shaft means opposite said handle means, said tool means including bracket means having first and second tab members thereon extending forwardly of said other end of said shaft means, said second tab member being engageable with the upper and lower looped ends of the bale-tie wire when the joiner tool is in a horizontal at rest position, the pivotal clockwise movement of the joiner tool to a vertical actuated position thereby causing the lower looped end to be cammed towards and become engaged with the upper looped end, and the pivotal return of the joiner tool to the horizontal at rest position thereby causing the upper and lower looped ends of the wire to be interlocked together.

2. The bale-tie joiner tool in accordance with claim 1 wherein said first and second tab members extend forwardly in different parallel planes.

3. The bale-tie joiner tool in accordance with claim 1 wherein said first and second tab members extend forwardly in parallel planes.

4. The bale-tie joiner tool in accordance with claim 3 wherein said tool means further includes a shoulder portion on said other end of said elongated shaft means and a projection element extending forwardly from said shoulder portion in a plane parallel to the plane of said tab members.

5. The bale-tie joiner tool in accordance with claim 1 wherein said bracket means is a U-shaped plate member having an outer peripheral arcuate edge formed on said second tab member, said arcuate edge being engageable with the upper pre-formed looped end during the engaging and interlocking operation of the bale-tie joiner tool.

6. The bale-tie joiner tool in accordance with claim 1 wherein said second tab member includes an extended slip hook member integrally mounted thereon for engaging the lower looped end during the engaging and interlocking operation of the bale-tie joiner tool.

7. A bale-tie joiner tool for use in engaging and interlocking together the upper and lower pre-formed looped ends of the bale-tie wire extending around a compressed bale, including in combination:

elongated shaft means, handle means on one end of said shaft means, and tool means positioned on said other end of said shaft means, said tool means including toggle bracket means having first and second toggle members which selectively engage the upper and lower pre-formed looped ends respectively of the bale-tie wire when the joiner tool is in the horizontal at rest position, upon the pivotal clockwise movement of the joiner tool to a vertical position, said first and second toggle members are pivotally moved thereby causing the lower looped end to be engaged with the upper looped end and then providing a toggle action wherein the lower looped end is released and interlocked together with the upper looped end.

8. A bale-tie joiner tool in accordance with claim 7, wherein one of said first or second engaging toggle members include a recess formed therein which is engageable with one of said upper or lower looped ends to provide said toggle action when the bale-tie joiner is in the vertical actuated position.

* * * * *